United States Patent
Shih et al.

(10) Patent No.: US 9,088,740 B2
(45) Date of Patent: Jul. 21, 2015

(54) SYSTEM AND METHOD OF REDUCING NOISE

(71) Applicant: Himax Imaging Limited, Tainan (TW)

(72) Inventors: Yen-Te Shih, Tainan (TW); Po-Chang Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 203 days.

(21) Appl. No.: 13/924,488

(22) Filed: Jun. 21, 2013

(65) Prior Publication Data

US 2014/0375850 A1   Dec. 25, 2014

(51) Int. Cl.
*H04N 5/357* (2011.01)

(52) U.S. Cl.
CPC .................. *H04N 5/357* (2013.01)

(58) Field of Classification Search
None
See application file for complete search history.

(56) References Cited

U.S. PATENT DOCUMENTS

| | | | | |
|---|---|---|---|---|
| 4,174,522 A | * | 11/1979 | Taguchi | 348/710 |
| 5,896,469 A | * | 4/1999 | Murakami | 382/266 |
| 7,477,781 B1 | * | 1/2009 | Tanbakuchi | 382/167 |
| 2002/0126892 A1 | * | 9/2002 | Gindele et al. | 382/166 |
| 2005/0219588 A1 | * | 10/2005 | Yoshida | 358/1.9 |
| 2005/0249417 A1 | * | 11/2005 | Song et al. | 382/199 |
| 2006/0233439 A1 | * | 10/2006 | Zhao | 382/168 |
| 2008/0007657 A1 | * | 1/2008 | Sakaguchi et al. | 348/708 |
| 2008/0137947 A1 | * | 6/2008 | Sawada et al. | 382/167 |
| 2008/0273102 A1 | * | 11/2008 | Hyakutake et al. | 348/246 |
| 2009/0033773 A1 | * | 2/2009 | Kinoshita et al. | 348/241 |
| 2009/0147111 A1 | * | 6/2009 | Litvinov et al. | 348/273 |
| 2011/0085729 A1 | * | 4/2011 | Shi et al. | 382/167 |
| 2011/0090371 A1 | * | 4/2011 | Cote et al. | 348/237 |
| 2011/0091101 A1 | * | 4/2011 | Cote et al. | 382/167 |
| 2011/0134292 A1 | * | 6/2011 | Hirai | 348/280 |
| 2011/0199542 A1 | * | 8/2011 | Hirai | 348/624 |
| 2012/0154646 A1 | * | 6/2012 | Sai et al. | 348/246 |
| 2012/0281123 A1 | * | 11/2012 | Hoda et al. | 348/246 |
| 2013/0050545 A1 | * | 2/2013 | Komatsu | 348/242 |
| 2013/0051665 A1 | * | 2/2013 | Shinozaki | 382/167 |
| 2013/0236096 A1 | * | 9/2013 | Cerundolo | 382/167 |
| 2014/0002697 A1 | * | 1/2014 | Tai et al. | 348/242 |
| 2014/0023268 A1 | * | 1/2014 | Tamura | 382/167 |

\* cited by examiner

*Primary Examiner* — Sean Motsinger
(74) *Attorney, Agent, or Firm* — Donald E. Stout; Stout, Uxa & Buyan, LLP

(57) ABSTRACT

In a system and method of reducing noise, an image sensor with a color filter array (CFA) outputs raw data, and a noise reduction device corrects the raw data according to distances between an original current pixel and neighboring same-color pixels in a process mask, thereby generating a new current pixel so as to output corrected raw data. A color interpolation device couples to receive the corrected raw data to result in full-color data.

16 Claims, 5 Drawing Sheets

SYSTEM AND METHOD OF REDUCING NOISE

BACKGROUND OF THE INVENTION

1. Field of the Invention

The disclosure generally relates to noise reduction, and more particularly to a system and method of reducing noise for an image sensor.

2. Description of Related Art

Images taken from a digital camera equipped with image sensor (such as a complementary metal-oxide-semiconductor (CMOS) image sensor) will inevitably pick up noise from a variety of sources. Common noise sources are flicker noise, bad pixel, Gaussian noise, green imbalance, etc. Noise reduction is generally required to remove noise as much as possible.

Conventional methods of reducing noise, however, are commonly devised to overcome one type of noise, and largely overlook distinct characteristics of the noises and ignore features in the image. As a result, conventional methods usually cannot satisfactorily achieve a desirable result.

For the foregoing reasons, a need has thus arisen to propose a novel scheme of reducing noise for an image sensor.

SUMMARY OF THE INVENTION

In view of the foregoing, it is an object of the embodiment of the present invention to provide a method of reducing noise for an image sensor such that different noise types may be properly reduced using appropriately suitable schemes, and the noise reduction may be performed in considerations of features in an image.

According to one embodiment, a system of reducing noise includes an image sensor with a color filter array (CFA), a noise reduction device, and a color interpolation device. The color filter array (CFA) placed over the image sensor is configured to output raw data. The noise reduction device is configured to correct the raw data according to distances between an original current pixel and neighboring same-color pixels in a process mask, thereby generating a new current pixel so as to output corrected raw data. The color interpolation device is coupled to receive the corrected raw data to result in full-color data.

BRIEF DESCRIPTION OF THE DRAWINGS

FIG. 3A and FIG. 3B show exemplary 5×5 process masks;

DETAILED DESCRIPTION OF THE INVENTION

Figure 1:
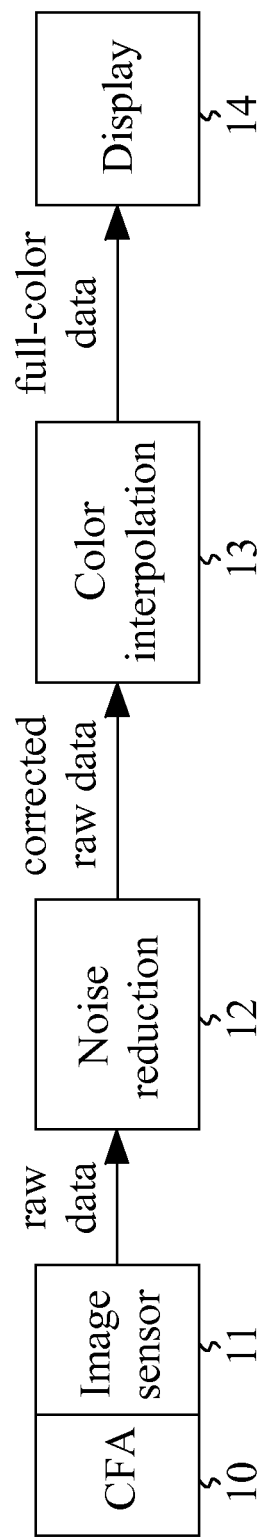
FIG. 1 shows a block diagram illustrative of a system of reducing noise according to one embodiment of the present invention.
Figure 2:
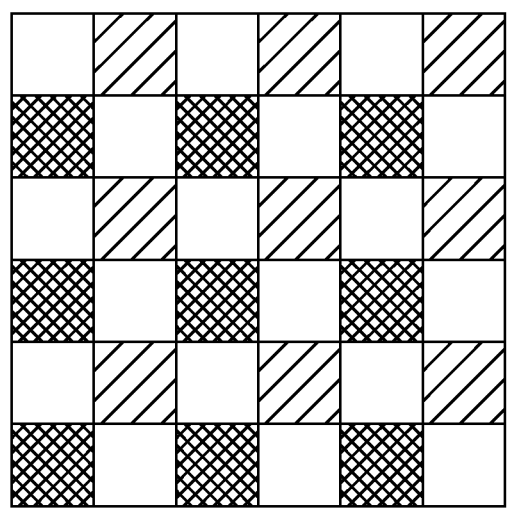
FIG. 2 shows a pattern of a Bayer CFA.
Figure 2:

FIG. 1 shows a block diagram illustrative of a system 100 of reducing noise according to one embodiment of the present invention. The system 100 of the embodiment includes an image sensor 11 (e.g., a complementary metal-oxide-semiconductor (CMOS) image sensor) with a color filter array (CFA) or color filter mosaic (CFM) 10, such as a Bayer CFA, placed over the image sensor 11, configured to output raw data. FIG. 2 shows a pattern of the Bayer CFA, which has 50% of green filters, 25% of blue filters and 25% of red filters. For example, each two-by-two sub-array contains two green filters, one blue filter and one red filter. The color filters filter an incident light, by wavelength, range such that the outputted raw data give information about intensity of light in red, green and blue (RGB) wavelength regions. Before the raw data are subjected to interpolation, by a color interpolation device 13, to result in full-color data that may, for example, be presented on a display device 14 (such as a liquid crystal display), the raw data in the embodiment are furthermore corrected by a noise reduction device 12, therefore generating corrected raw data which are rendered with substantially low amount of noise. The noise reduction device 12 and/or the color interpolation device 13 may be part of an image signal processor (ISP), or be implemented in hardware and/or software operated under control of the ISP.

Figures 3A, 3B:
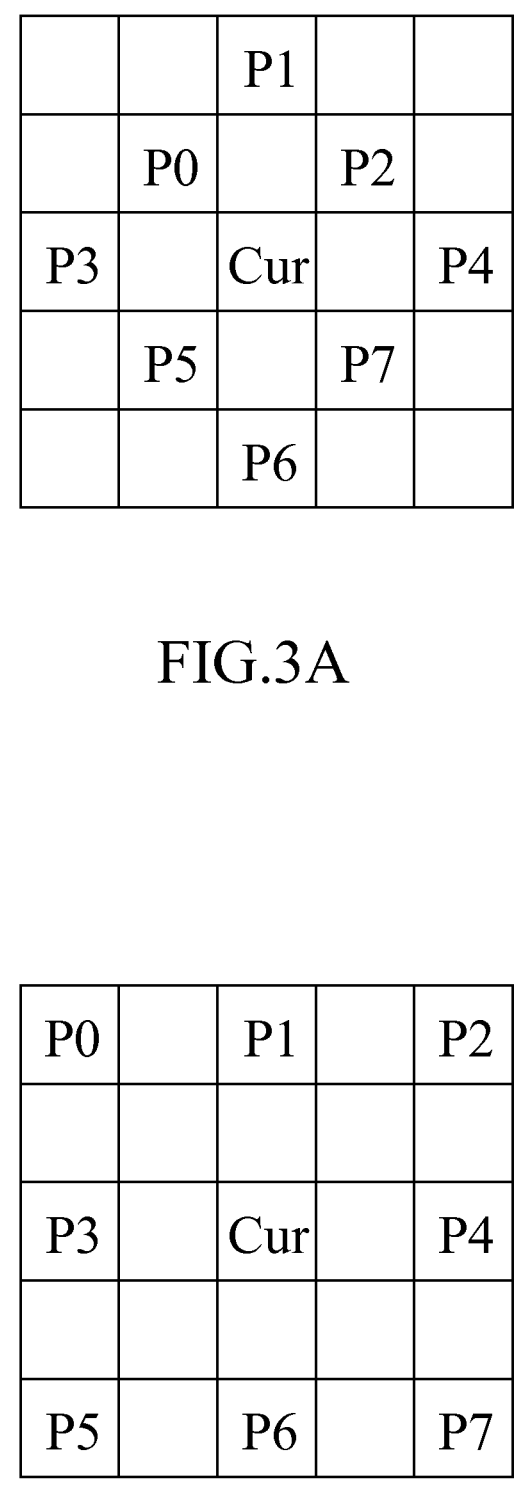

FIG. 3A shows an exemplary 5×5 process mask (or window) for green pixels that passes over and process an image made of the raw data in an order, for example, from top to bottom and from left to right. A current green pixel Cur is located at a center of a center line. Top two lines including neighboring same-color (i.e., green) pixels P0, P1 and P2 are passed (or processed), and bottom two lines including neighboring same-color (i.e., green) pixels P5, P6 and P7 are non-passed (or non-processed). FIG. 3B shows another exemplary 5×5 process mask with a center line including a current non-green (e.g., blue) pixel Cur located at a center of the center line and neighboring same-color (i.e., non-green or blue) pixels P3 and P4; top two passed lines including neighboring (non-green or blue) pixels P0, P1 and P2; and bottom two non-passed lines including neighboring same-color (i.e., non-green or blue) pixels P5, P6 and P7. In the specification, "neighboring same-color pixel" and "neighboring pixel" are used interchangeably to connote the same matter.

Figure 4:
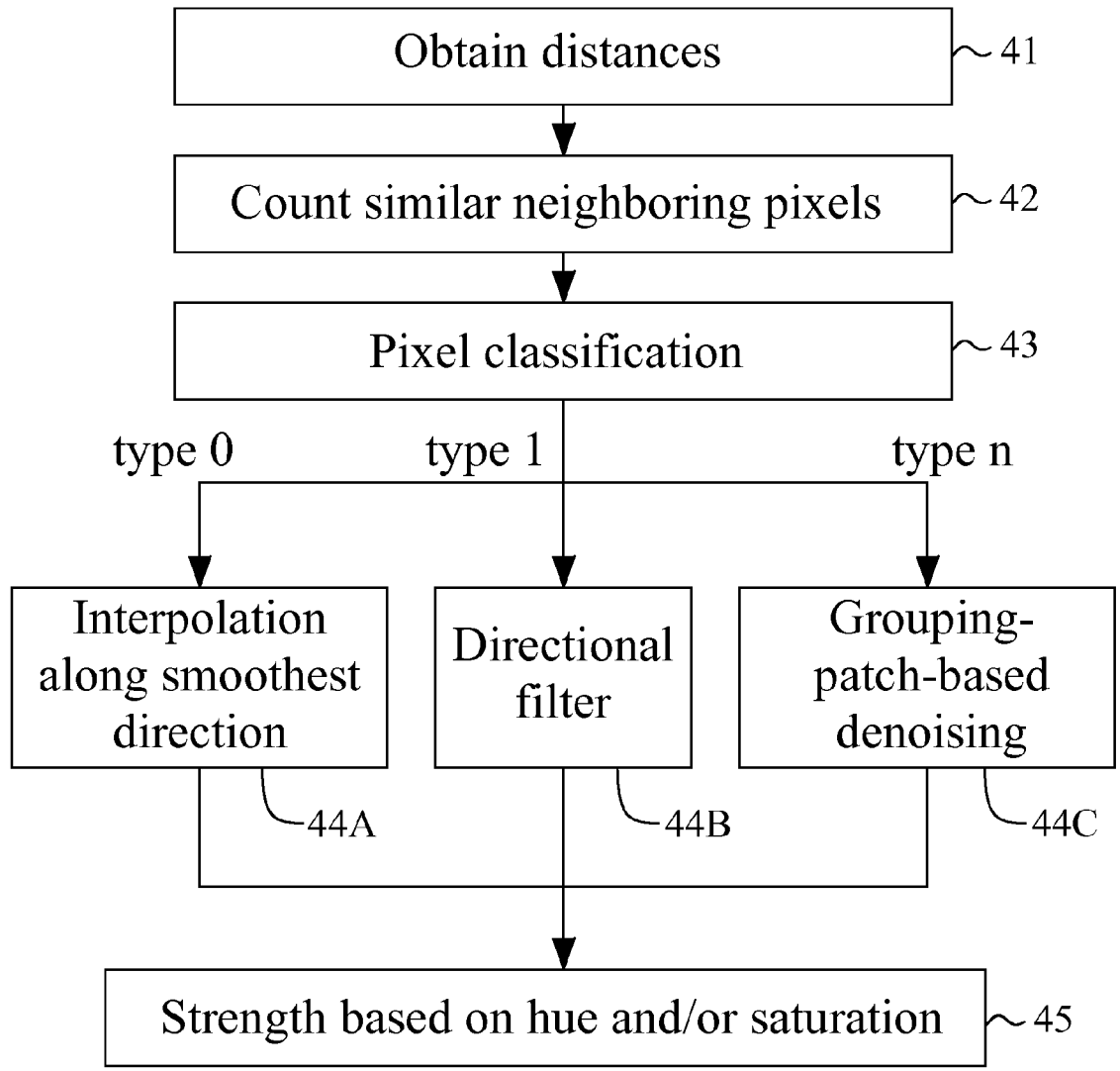
FIG. 4 shows a flow diagram illustrative of a method of reducing noise according to one embodiment of the present invention.

FIG. 4 shows a flow diagram illustrative of a method of reducing noise according to one embodiment of the present invention. In step 41, distances (or absolute differences) between a current pixel and neighboring pixels are obtained, respectively. In step 42, the obtained distances are compared with a noise threshold, respectively. In the embodiment, the noise threshold may be user-defined. If the obtained distance is smaller than the noise threshold, its associated neighboring pixel is determined as a similar neighboring pixel. In other words, the similar neighboring pixel has a value substantially close to a value of the current pixel with a difference less than the noise threshold. In step 43, the current pixel is classified into multiple types according to a number (or count) of similar neighboring pixels. If no similar neighboring pixel is determined (i.e., type 0), it indicates that the current pixel may probably be a bad pixel. If one similar neighboring pixel is determined (i.e., type 1), it indicates that the current pixel may probably be an end of line. If two or more similar neighboring pixels are determined, type n (n=2 to 8 for 5×5 process mask as exemplified in FIG. 3A/3B) is assigned. According to one aspect of the embodiment, (current) pixel is classified into different types according to different counts of similar neighboring pixels (in step 43), and pixels of different types are then processed to reduce noise using different schemes (steps 44A, 44B and 44C).

Regarding a current pixel of type 0, in step 44A, an interpolation may be performed on neighboring pixels along a smoothest direction to result in a corrected value as a new current pixel. Taking FIG. 3A or 3B as an example, if a direction of P0–P7 is the smoothest direction, for example, |P0−P7|<|P1−P6|<|P2−P5|<|P3−P4|, the current pixel Cur is thus replaced by a corrected value (e.g., an interpolated value (P0+P7)/2) along the direction P0-P7.

Regarding a current pixel of type 1, in step 44B, a directional filter may be adopted to perform interpolation on neighboring pixels and the current pixel along a direction of the similar neighboring pixel and the current pixel to result in a corrected value as a new current pixel. Taking FIG. 3A or 3B as an example, if a direction of P0 is the (only) similar neighboring pixel, the current pixel Cur is thus replaced by a corrected value (e.g., an interpolated value (P0+P7+Cur)/3) along the direction P0-Cur-P7.

Figures 5A, 5B:
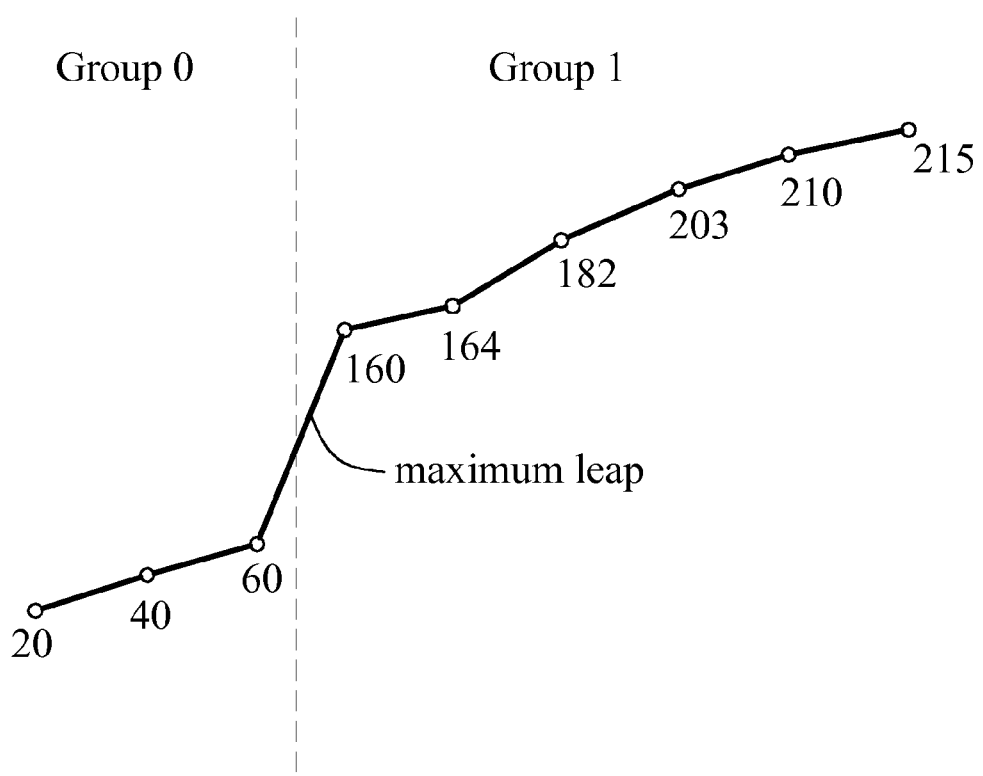
FIG. 5A exemplifies a current pixel of type 8.
FIG. 5B shows pixel values of FIG. 5A in order.

Regarding a current pixel of type n (e.g., n=2 to 8), in step 44C, a grouping-patch-based denoising scheme may be adopted on a portion of similar neighboring pixels and the current pixel to result in a corrected value as a new current pixel. Specifically, according to another aspect of the embodiment, the similar neighboring pixels and the current pixel are first categorized into two groups, i.e., group 0 and group 1. FIG. 5A exemplifies a current pixel of type 8, and FIG. 5B shows pixel values in order. The eight similar neighboring pixels and the current pixel are categorized into group 0 and group 1 along a maximum leap. As a result, group 0 has pixel values less than pixel values of group 1, and the maximum pixel value of group 0 has a maximum leap toward the minimum pixel value of group 1. Subsequently, the group having more pixels is determined as a selected group, and the other group is discarded. In a case that both groups have the same number of pixels, a group including the current pixel is determined, as a selected group.

Afterwards, median or mean operation may be performed on the selected group based on a range of the selected, group, thereby obtaining a corrected value. In the embodiment, the range is defined as an absolute difference between a maximum pixel value and a minimum pixel value of the selected group. If the range is higher than a predetermined value, median operation (median value is used; otherwise, mean operation (mean value) is used.

According to a further aspect of the embodiment, in step 45, the mixing of the new current pixel obtained, from step 44A, 44B or 44C and the original current pixel may be further adjusted according to hue and/or saturation of the pixels to generate full-color data. Hue and saturation information may be obtained from red/green/blue pixels using conventional methods. With respect to hue information, if it is determined that hue (within the process mask) of the original current pixel is substantially different from hue of the new current pixel (for example, an absolute difference therebetween is higher than a predetermined value), the new current pixel is then adjusted (e.g., multiplied) by a smaller strength/weight and the original current pixel is adjusted by a larger strength/weight, and vice versa. In other words, less denoising is performed when large hue variation is detected, and vice versa.

With respect to saturation information, if it is determined that saturation (within the process mask) is low (for example, red, green and blue pixels have average values being substantially close to each other, for example, an absolute difference therebetween is less than a predetermined value), the new current pixel is then adjusted (e.g., multiplied) by a smaller strength/weight and the (original) current pixel is adjusted by a larger strength/weight, and vice versa. In other words, less denoising is performed when low saturation is detected, and vice versa.

Although specific embodiments have been illustrated and described, it will be appreciated by those skilled in the art that various modifications may be made without departing from the scope of the present invention, which is intended to be limited solely by the appended claims.

What is claimed is:

1. A system of reducing noise, comprising:
   an image sensor with a color filter array (CFA) placed over the image sensor configured to output raw data;
   a noise reduction device configured to correct the raw data according to distances between an original current pixel and neighboring same-color pixels in a process mask, thereby generating a new current pixel so as to output corrected raw data; and
   a color interpolation device coupled to receive the corrected raw data to result in full-color data;
   wherein the distances are compared with a noise threshold, respectively, wherein if the distance under comparison is smaller than the noise threshold, its associated neighboring same-color pixel is then determined as a similar neighboring same-color pixel;
   wherein the similar neighboring same-color pixels and the original current pixel are categorized into group 0 and group 1 along a maximum leap; the group having more pixels is determined as a selected group; and median or mean operation is performed on pixels of the selected group based on a range of the selected group, thereby obtaining the new current pixel.

2. The system of claim 1, wherein the original current pixel is classified into one of multiple types according to a count of the similar neighboring same-color pixels.

3. The system of claim 2, wherein the noise reduction device performs interpolation on the neighboring same-color pixels along a smoothest direction to result in the new current pixel, if the number of the similar neighboring same-color pixels is equal to zero.

4. The system of claim 2, wherein the noise reduction device performs interpolation on the neighboring same-color pixels and the original current pixel along a direction of the similar neighboring same-color pixel and the original current pixel to result in the new current pixel, if the number of the similar neighboring same-color pixels is equal to one.

5. The system of claim 2, wherein the noise reduction device performs interpolation on a portion of the similar neighboring same-color pixels and the original current pixel to result in the new current pixel, if the number of the similar neighboring same-color pixels is equal to two or more.

6. The system of claim 1, wherein mixing of the original current pixel and the new current pixel are further adjusted according to hue and/or saturation of pixels in the process mask.

7. The system of claim 6, wherein the new current pixel is adjusted by a smaller strength/weight and the original current pixel is adjusted by a larger strength/weight, if it is determined that the hue of the original current pixel is substantially different from hue of the new current pixel.

8. The system of claim 6, wherein the new current pixel is adjusted by a smaller strength/weight and the original current pixel is adjusted by a larger strength/weight, if it is determined that the saturation is low.

9. A method of reducing noise, comprising:
   outputting raw data from an image sensor with a color filter array (CFA) placed over the image sensor;
   correcting the raw data according to distances between an original current pixel and neighboring same-color pixels in a process mask, thereby generating a new current pixel so as to output corrected raw data; and
   color interpolating the corrected raw data to result in full-color data;

wherein the distances are compared with a noise threshold, respectively, wherein if the distance under comparison is smaller than the noise threshold, its associated neighboring same-color pixel is then determined as a similar neighboring same-color pixel;

wherein the similar neighboring same-color pixels and the original current pixel are categorized into group 0 and group 1 along a maximum leap; the group having more pixels is determined as a selected group; and median or mean operation is performed on pixels of the selected group based on a range of the selected group, thereby obtaining the new current pixel.

10. The method of claim 9, wherein the original current pixel is classified into one of multiple types according to a count of the similar neighboring same-color pixels.

11. The method of claim 10, wherein interpolation is performed on the neighboring same-color pixels along a smoothest direction to result in the new current pixel, if the number of the similar neighboring same-color pixels is equal to zero.

12. The method of claim 10, wherein interpolation is performed on the neighboring same-color pixels and the original current pixel along a direction of the similar neighboring same-color pixel and the original current pixel to result in the new current pixel, if the number of the similar neighboring same-color pixels is equal to one.

13. The method of claim 10, wherein interpolation is performed on a portion of the similar neighboring same-color pixels and the original current pixel to result in the new current pixel, if the number of the similar neighboring same-color pixels is equal to two or more.

14. The method of claim 9, wherein mixing of the original current pixel and the new current pixel are further adjusted according to hue and/or saturation of pixels in the process mask.

15. The method of claim 14, wherein the new current pixel is adjusted by a smaller strength/weight and the original current pixel is adjusted by a larger strength/weight, if it is determined that the hue of the original current pixel is substantially different from hue of the new current pixel.

16. The method of claim 14, wherein the new current pixel is adjusted by a smaller strength/weight and the original current pixel is adjusted by a larger strength/weight, if it is determined that the saturation is low.

* * * * *